(12) United States Patent
Albrecht et al.

(10) Patent No.: US 7,553,426 B2
(45) Date of Patent: Jun. 30, 2009

(54) APPARATUS, SYSTEM, AND METHOD FOR INCREASING DATA STORAGE DENSITY IN PATTERNED MEDIA

(75) Inventors: Thomas Robert Albrecht, San Jose, CA (US); Henry Hung Yang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 291 days.

(21) Appl. No.: 11/069,874

(22) Filed: Mar. 1, 2005

(65) Prior Publication Data

US 2006/0196844 A1 Sep. 7, 2006

(51) Int. Cl.
*B44C 1/22* (2006.01)
(52) U.S. Cl. .............................. 216/22; 216/67; 427/599
(58) Field of Classification Search .................... 216/67, 216/22; 427/599
See application file for complete search history.

(56) References Cited

U.S. PATENT DOCUMENTS

| | | | |
|---|---|---|---|
| 4,321,282 A | 3/1982 | Johnson | |
| 4,776,938 A | 10/1988 | Abe et al. | |
| 4,935,278 A | 6/1990 | Krounbi et al. | |
| 5,185,055 A | 2/1993 | Temple et al. | |
| 5,985,105 A * | 11/1999 | Smoliar | 204/192.2 |
| 6,042,998 A | 3/2000 | Brueck et al. | |
| 6,313,905 B1 | 11/2001 | Brugger et al. | |
| 6,411,459 B1 | 6/2002 | Belser et al. | |
| 6,420,058 B1 | 7/2002 | Haratani et al. | |
| 6,451,508 B1 | 9/2002 | Bukofsky et al. | |
| 6,511,791 B1 | 1/2003 | Bukofsky et al. | |
| 6,579,421 B1 * | 6/2003 | Fu | 204/192.12 |
| 6,719,841 B2 | 4/2004 | Chen et al. | |
| 2003/0008099 A1 | 1/2003 | Nishikawa et al. | |
| 2003/0146084 A1 * | 8/2003 | Fu | 204/192.2 |
| 2004/0101713 A1 | 5/2004 | Wachenschwanz et al. | |
| 2004/0127012 A1 | 7/2004 | Jin | |
| 2004/0150311 A1 | 8/2004 | Jin | |
| 2004/0151947 A1 | 8/2004 | Rodmacq et al. | |

(Continued)

FOREIGN PATENT DOCUMENTS

JP 2042723 2/1990

(Continued)

OTHER PUBLICATIONS

S. Wolf and R.N. Tauber, (Silicon Processing for the VLSI Era, vol. 1—Process Technology, Lattice Press, 1986) p. 541.*

(Continued)

*Primary Examiner*—Nadine G Norton
*Assistant Examiner*—Mahmoud Dahimene
(74) *Attorney, Agent, or Firm*—Kunzler & McKenzie

(57) ABSTRACT

An apparatus, system, and method are disclosed for increasing data storage density in patterned media. One or more deposition sources may apply magnetic material to one or more recesses formed in a substrate, each recess having opposing sidewalls that are effectively coated by the deposition sources. The top surface of the substrate may subsequently be planarized to remove magnetic material from such surface, thereby isolating one or more recordable magnetic regions formed on each sidewall. In this manner, the present invention may provide at least two recordable regions for every recess formed in a substrate.

17 Claims, 8 Drawing Sheets

U.S. PATENT DOCUMENTS

2004/0156108 A1 8/2004 Chou et al.
2005/0069634 A1* 3/2005 Yoshimura .................. 427/127

FOREIGN PATENT DOCUMENTS

JP 4176021 6/1992

OTHER PUBLICATIONS

Landis et al. (Japanese Journal of Applied Physics, vol. 43, No. 6B (Jun. 2004), pp. 3790-3795).*

Gyuman Kim, et al., Photoplastic Shadow-Masks for Rapid Resistless Multi-Layer Micropatterning, The 11$_{th}$ International Conference on Solid-State Sensors and Actuators, Munich Germany, Jun. 10-14, 2000, p. 1632-1635.

Roli Lüthi, et al., Parallel Nanodevice Fabrication Using A Combination of Shawdow Mask and Scanning Probe Methods, Applied Physics Letters vol. 75, No. 9, p. 1314-1316.

S. Landis et al., "Realization and characterization of magnetic media deposited on side edge of patterned silicon dot arrays," Microprocesses and Nanotechnology Conference, 2003. Digest of Papers. 2003 International, pp. 60-61.

S.E. Lambert, "Beyond discrete tracks: Other aspects of patterned media," J. Appl. Phys.69 (8), Apr. 15, 1991, pp. 4724-4726.

"Magnetically Discrete but Physically continuous Recording Tracks," IBM Technical Disclosure Bulletin, Oct. 1975, p. 1641-1642.

* cited by examiner

APPARATUS, SYSTEM, AND METHOD FOR INCREASING DATA STORAGE DENSITY IN PATTERNED MEDIA

BACKGROUND OF THE INVENTION

1. Field of the Invention

This invention relates to an information storage medium and more particularly relates to methods, systems and apparatus for depositing magnetic material on patterned media to increase information storage density.

2. Description of the Related Art

Nearly every computer in use today uses one or more hard disk drives to store changing digital information in a relatively permanent form. Hard disk drives are also becoming increasingly pervasive in media players, digital recorders, and other personal devices.

Hard disks typically comprise high precision aluminum or glass disks coated on both sides with a special thin film media designed to store information in the form of magnetic patterns. The disks are rotated at high speeds, and electromagnetic read/write heads are used to either record information onto the thin film media, or read information from it.

Thin film media employed in hard disk drives have typically comprised a thin, continuous layer of magnetic grains that may be magnetized in a particular orientation by a strong magnetic field. A read/write head, for example, can record information by creating a 6local magnetic field that orients a cluster of grains, known as a bit, in one direction or the other. To increase the capacity of disk drives, manufacturers are continually striving to reduce the size of bits and the grains that comprise the bits.

The ability of individual magnetic grains to be magnetized in one direction or the other, however, poses problems where grains are extremely small. The superparamagnetic effect results when the product of a grain's volume (V) and its anisotropy energy (ku) fall below a certain value such that the magnetization of that grain may flip spontaneously. Where this occurs, data stored on the disk is corrupted. Thus, while it is desirable to make smaller grains to support higher density recording with less noise, grain miniaturization is inherently limited by the superparamagnetic effect.

In response to this problem, engineers have developed patterned media. In patterned media, the magnetic thin film layer is typically created as an ordered array of highly uniform islands, each island capable of storing an individual bit. Each bit may be one grain, or several exchange coupled grains, rather than a collection of random decoupled grains. In this manner, patterned media effectively reduces noise by imposing linear magnetic transitions.

Indeed, patterned media provides physical as well as magnetic separation of data, effectively circumventing the density limitations imposed by the superparamagnetic effect. Despite the advantages of such media, however, known patterned magnetic storage media are also inherently limited in data storage capacity by dimensional island requirements.

Known methods for producing patterned magnetic storage media deposit a blanket of magnetic material over the disk. This material collects on top of the islands, as well as in the valleys between the islands. If the islands are raised high enough above the valleys, the magnetic material on the tops of the islands is physically and magnetically isolated from adjacent islands, as well as from material in the valleys. Known methods for producing magnetic media thus inherently limit track density to match dimensional island requirements as such methods necessarily create just one recordable region per island.

From the foregoing discussion, it should be apparent that a need exists for an apparatus, system, and method that increases track density while maintaining physical and magnetic separation of data. Beneficially, such an apparatus, system, and method would increase the effective area sensitive to read/write heads, increase data storage capabilities, decrease the flying distance of read/write heads, and optimize overall data storage performance. Such methods, systems and apparatus are disclosed and claimed herein.

SUMMARY OF THE INVENTION

The present invention has been developed in response to the present state of the art, and in particular, in response to the problems and needs in the art that have not yet been fully solved by currently available information storage media. Accordingly, the present invention has been developed to provide an apparatus, system, and method for increasing data storage density in patterned media that overcome many or all of the above-discussed shortcomings in the art.

The data storage apparatus in accordance with certain embodiments of the present invention is provided with a substrate having a top surface and at least one recess formed therein, where the each recess comprises a bottom surface and opposing sidewalls. At least one recordable region may be formed on each of the opposing sidewalls to provide at least two recordable regions for every recess.

The apparatus, in one embodiment, provides magnetic material deposited at an angle substantially oblique to its top surface to form the recordable regions. The magnetic material may be deposited in a vacuum from more than one oblique angle such that the magnetic material is preferentially deposited on opposing sidewalls while the bottom surface of the recess remains substantially free of magnetic material. The magnetic material may comprise iron, nickel, cobalt, or alloys of the same.

A system of the present invention is also presented to increase data storage density on a magnetic storage medium. The system may be embodied by at least one deposition source adapted to direct the magnetic material to opposing sidewalls of at least one recess formed in a substrate, and planarizing equipment configured to planarize a top surface of the substrate and thereby provide at least two recordable regions per recess. In particular, the deposition source, in one embodiment, may be adapted to direct magnetic material to the magnetic storage medium at a substantially oblique angle of incidence relative to the surface of the storage medium. In this manner, the magnetic material may adhere to the opposing sidewalls while leaving the bottom surface substantially free of magnetic material.

The system may further include a stationary shield portion and a rotational element to facilitate precise deposition of the magnetic material onto the opposing sidewalls. In particular, the stationary shield portion may include a substantially narrow aperture corresponding to an exposed portion of the magnetic storage medium. As the rotational element rotates the magnetic storage medium, which may be substantially aligned with the shield, only the exposed portion is subject to magnetic material deposition at any given time. The stationary shield portion and rotational element thus facilitate controlled deposition of the magnetic material onto opposing sidewalls by constraining an angle of incidence for deposited material. Constraining the angle of incidence enables deposition on the sidewalls of recesses within the exposed portion of the magnetic storage medium while leaving the bottom of each recess substantially free of magnetic material.

The planarizing equipment may include, in one embodiment, chemical polishing equipment, mechanical polishing equipment, or a combination thereof effective to isolate recordable regions of adjacent recesses by eliminating any magnetic material from the top surface of the magnetic storage medium. In addition, planarizing the surface of the storage medium enables decreased flying distance of a read/write head by promoting increased planarity of the magnetic storage medium.

A method of the present invention is also presented for providing increased storage density on a magnetic storage medium. In one embodiment, the method includes forming at least one recess on a substrate, depositing magnetic material on the opposing sidewalls of the at least one recess while leaving the bottom of the recess substantially free of magnetic material, and planarizing the top surface to isolate at least one recordable region on each of the opposing sidewalls. The method also may include directionally applying the magnetic material to opposing sidewalls from at least one oblique angle of incidence, rotating the magnetic storage medium to facilitate controlled deposition of the magnetic material, and providing a stationary shield proximate the magnetic storage medium to confine deposition of the magnetic material to a limited surface area of the magnetic storage medium.

In a further embodiment, the method includes implementing at least one of a chemical polishing process and a mechanical polishing process to eliminate magnetic material from the top surface of the magnetic storage medium, thereby isolating the at least one recordable region on each opposing sidewall.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention increases storage density over currently available storage media. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
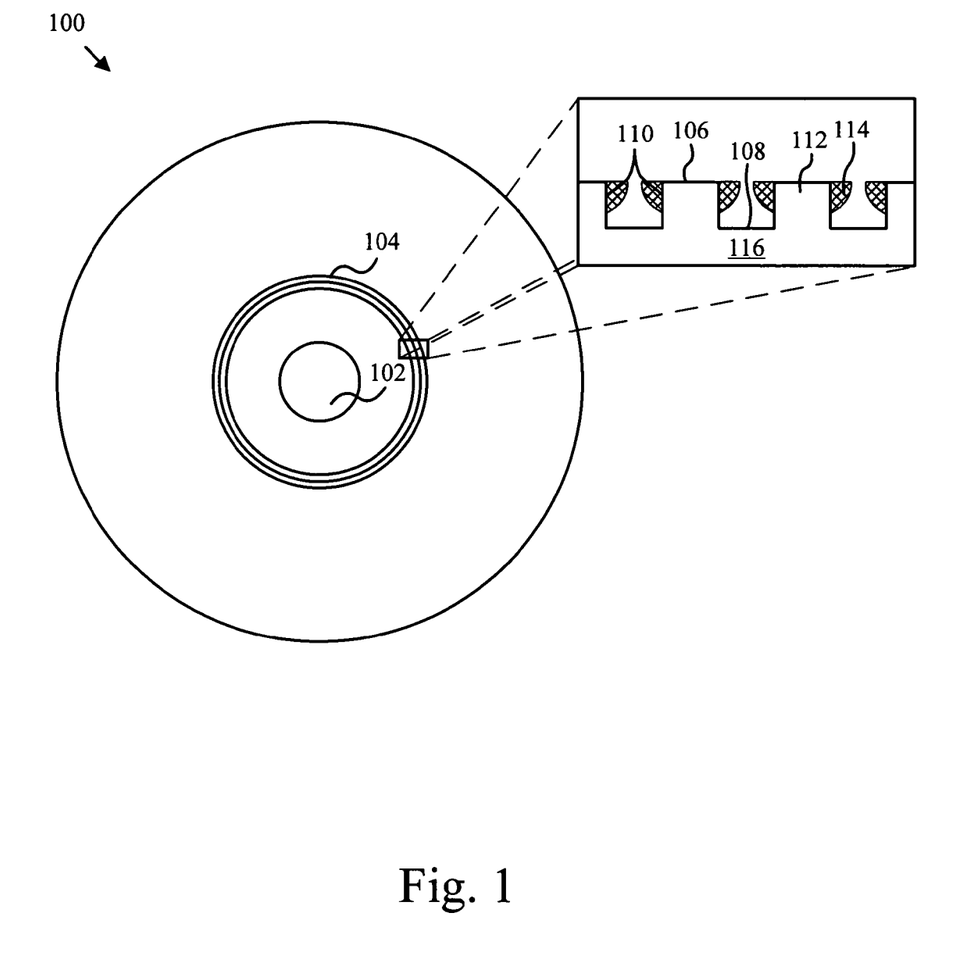
FIG. 1 is a perspective view of a magnetic storage medium illustrating one embodiment of an apparatus for increasing data storage density in accordance with the present invention.

FIG. 1 depicts a magnetic storage medium 100 in accordance with certain embodiments of the present invention. A magnetic storage medium 100 generally comprises a substantially rigid, disk-shaped substrate 116 having a thin media layer disposed thereon. The substrate 116 may comprise the bulk of the magnetic storage medium and, in one embodiment, is easy to work with, lightweight, stable, magnetically inert, inexpensive and readily available. The substrate 116 may comprise, for example, aluminum, aluminum alloy, glass, glass composite, magnesium alloy, or any other material known to those in the art suitable for supporting a media layer. The substrate 116 may include a central hole 102 standardized to accommodate a spindle (not shown), and a plurality of annular recesses 104 formed therein that are substantially concentric about the hole 102.

In certain embodiments, an annular recess 104 may be formed within the substrate material by nanoimprint replication, or alternatively, by nanoimprint lithography or other methods known to those of skill in the art. Specifically, annular recesses 104 in accordance with the present invention may be formed according to the method set forth in U.S. patent application Ser. No. 11/098,628 entitled, "APPARATUS, METHOD AND SYSTEM FOR FABRICATING A PATTERNED MEDIA IMPRINT MASTER," filed on Apr. 4, 2005 by the present inventors, incorporated herein in its entirety by reference.

Where annular recesses 104 are formed in a substrate 116 in accordance with certain embodiments of the present invention, the substrate 116 may comprise top surfaces 106, bottom surfaces 108, and opposing sidewalls 110. Specifically, a bottom surface 108 and opposing sidewalls 110 may correspond to each annular recess 104. In some embodiments, the top surface 106 may be substantially planar to facilitate a lower flying distance of a read/write head. Alternatively, the top surface 106 may feature a rounded, pillar-like profile that is subsequently flattened during processing. In any case, the substrate 116 in accordance with the present invention may comprise alternating top and bottom surfaces 106 and 108, forming a ridge 112 between each annular recess 104. Each opposing sidewall 110 of an annular recess 104 thus corresponds to a discrete ridge 112. A thin media layer comprising magnetic material 114 may be disposed on opposing sidewalls 110 of an annular recess 104 to form independent recordable regions, as discussed in more detail with reference to FIGS. 2 and 3 below.

Figure 2:
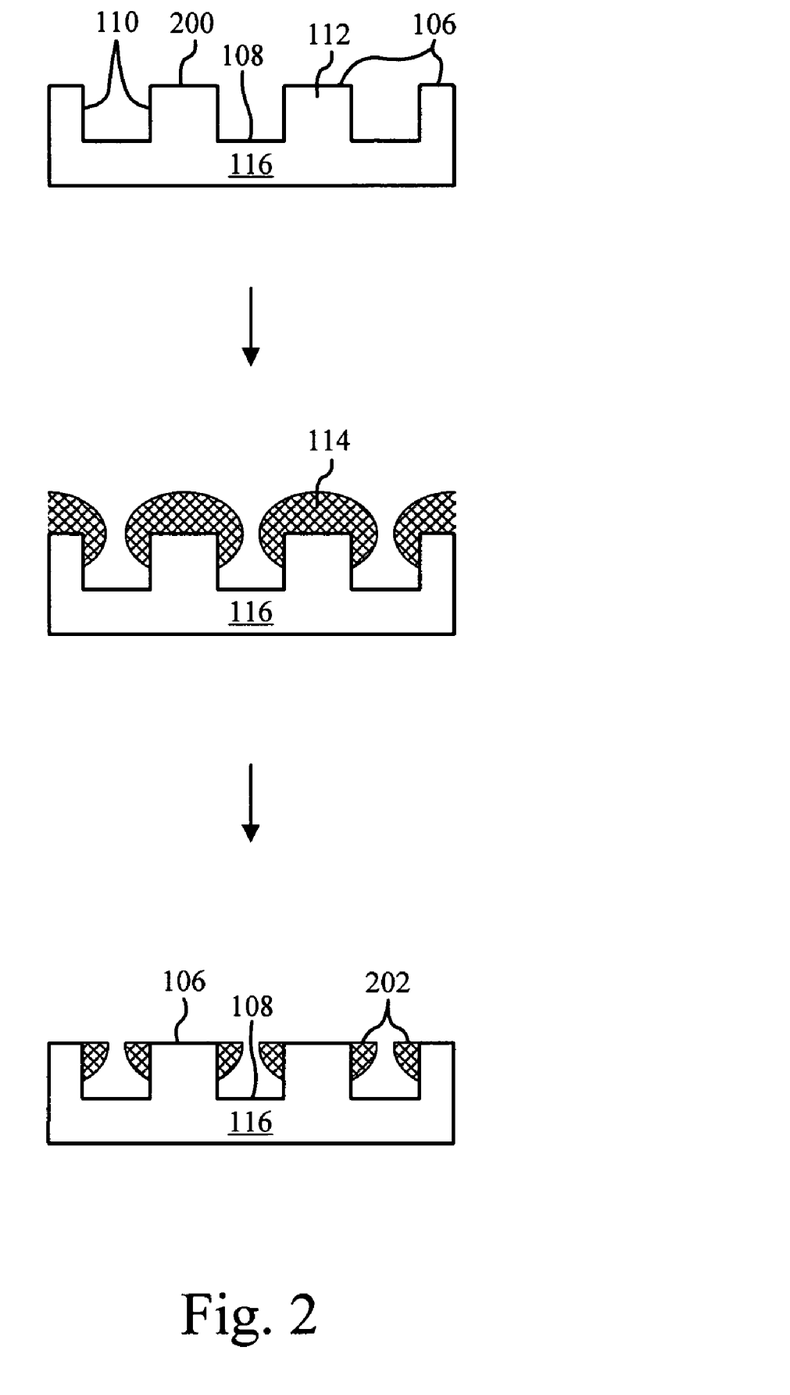
FIG. 2 is an enlarged cross-sectional view of a plurality of annular recesses disposed in a magnetic storage medium in various stages of processing in accordance with certain embodiments of the present invention.
Figure 3:
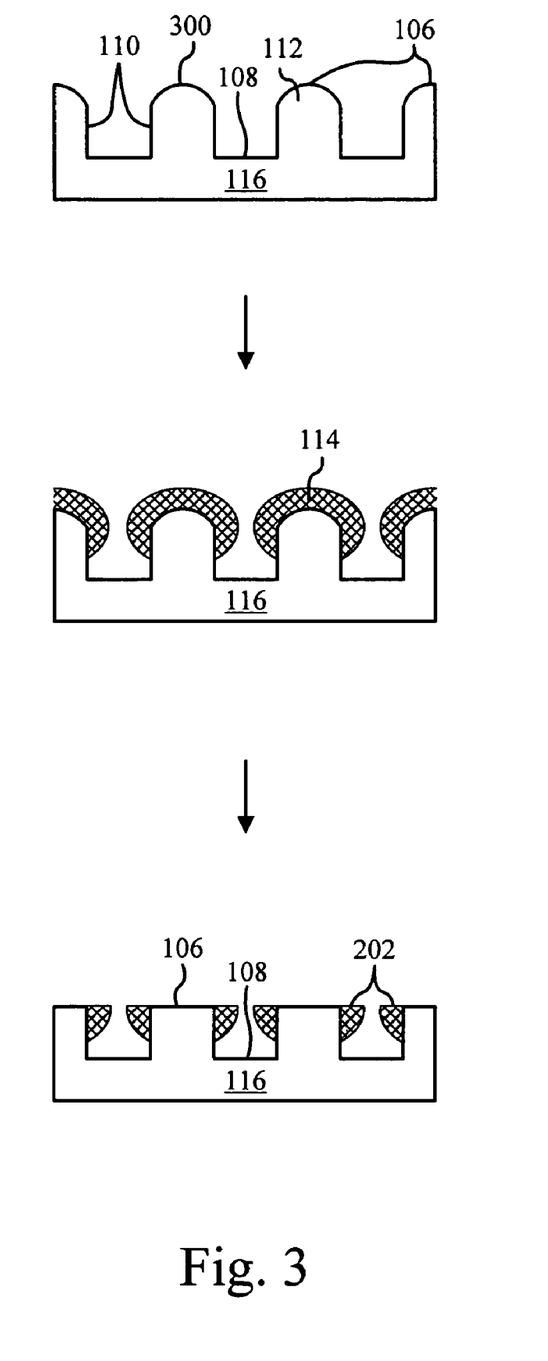
FIG. 3 is an enlarged cross-sectional view of an alternate embodiment of the annular recesses of FIG. 2 in various stages of a method for increasing data storage density in accordance with certain embodiments of the present invention.

Referring now to FIGS. 2 and 3, magnetic material 114 may be deposited onto a substrate 116 as outlined below. First, as discussed above with reference to FIG. 1, a substrate 116 having a plurality of substantially concentric annular recesses 104 may be provided such that each annular recess 104 comprises a bottom surface 108 and opposing sidewalls 110. Since top and bottom surfaces 106 and 108 of a substrate 116 alternate to form alternating ridges 112 and recesses 104, a top surface 106 may correspond to more than one annular recess 104.

As previously mentioned, a cross-sectional profile of a ridge 112 may be substantially planar plateau 200 as depicted by FIG. 2, or may resemble a rounded pillar 300, as depicted by FIG. 3. Because the cross-sectional profile of the ridge 112 determines the surface area geometry exposed to magnetic material 114 during a deposition process, the resulting magnetic recordable region 202 pattern may vary according to such profile. In certain embodiments, a substantially planar cross-sectional profile 200 is preferred to expose a greater surface area of the magnetic material 114 to a read/write head. Further, a substantially planar cross-sectional profile 200 facilitates decreased flying distance of a read/write head, thereby optimizing storage medium performance overall.

Magnetic material 114 may be deposited to adhere to selected surfaces of the substrate 116. Specifically, magnetic material 114 may be deposited at a substantially oblique angle of incidence relative to the substrate 116 such that the magnetic material 114 adheres to at least one opposing sidewall 110 of an annular recess 104. Magnetic material 114 may be successively deposited at a second substantially oblique angle of incidence relative to the substrate 116 to adhere to a second opposing sidewall 110 of an annular recess 104, and so on as needed. In certain embodiments, magnetic material 114 may be deposited substantially simultaneously from more than one oblique angle of incidence to simplify a magnetic material deposition process. In any case, deposition of the magnetic material 114 from more than one substantially oblique angle of incidence relative to the substrate 116 results in a layer of magnetic material 114 preferentially disposed on opposing sidewalls 110 of annular recesses 104 formed in the substrate 116, while enabling a bottom surface 108 of each annular recess 104 to remain substantially hidden from deposition. Alternatively, a bottom surface 108 may be coated with a protective material to prevent adherence of a magnetic material 114 directly deposited onto the substrate 116.

In certain embodiments, magnetic material 114 is deposited onto the substrate 116 by physical vapor deposition techniques, such as evaporation, ion plating or sputtering. Such physical vapor deposition processes transport magnetic material 114 in a vaporized state from a deposition source to a target substrate 116. Vaporized particles of the magnetic material 114 may condense onto the substrate according to a substantially collisionless line-of-sight transport, or may adhere to the substrate 116 as a result of high-energy momentum transfer. Physical vapor deposition processes enable a more uniform and flat substrate surface than other deposition techniques, and promote excellent bonding of the magnetic material 114 to the substrate 116 at high deposition rates.

Physical vapor deposition techniques also facilitate accuracy in magnetic material 114 deposition on opposing sidewalls 110, although such techniques are generally incapable of providing complete isolation of opposing sidewalls 110 during deposition. Indeed, magnetic material 114 streams from one or more deposition sources to deposit such material 114 on any exposed substrate surface. Although an angle of deposition combined with ridge 112 height may protect bottom surfaces 108 from exposure to magnetic material 114, top surfaces 106 of the substrate 116 are generally incapable of protection, absent a protective coating applied thereto.

In certain embodiments, the width of a bottom surface 108 of an annular recess 104 may be sufficiently narrow to indirectly isolate magnetic material 114 on opposing sidewalls 110 without requiring directional deposition of magnetic material 114 as outlined above. As with directional deposition techniques, however, top surfaces 106 of the substrate 116 will necessarily be exposed to magnetic material 114 during such deposition techniques, absent a protective coating applied thereto.

Accordingly, a third step of a magnetic material deposition process may include planarizing exposed top surfaces 106 to eliminate magnetic material 114 disposed thereon. This step effectively isolates at least one discrete recordable region 202 on each opposing sidewall 110. Planarizing the top surfaces 106 isolates discrete recordable regions 202 both physically and magnetically. In this manner, the present invention substantially increases track density and associated data storage capacity in a magnetic storage medium 100.

Planarizing top surfaces 106 of annular recesses 104 formed in a substrate 116 may be achieved by chemical polishing, mechanical polishing, or a combination thereof. Planarizing top surfaces 106 may comprise, for example, applying a reactive liquid medium to the substrate 116 and mechanically polishing the top surfaces 106 thereof with a polishing pad surface. In some embodiments, a reactive liquid medium may comprise a slurry of nano-size particles of inorganic materials such as silica, alumina, ceria, and/or any other such material known to those in the art.

In certain embodiments, a filler material may be applied to the substrate 116 prior to planarizing exposed top surfaces 106 to fill annular recesses 104 and thereby promote increased planarity of the substrate 116. A filler material may be a chemically neutral, magnetically inert substance capable of being planarized by the same method selected to planarize top surfaces 106 as set forth above. In one embodiment, for example, a filler material includes spin-on glass.

Figure 4:
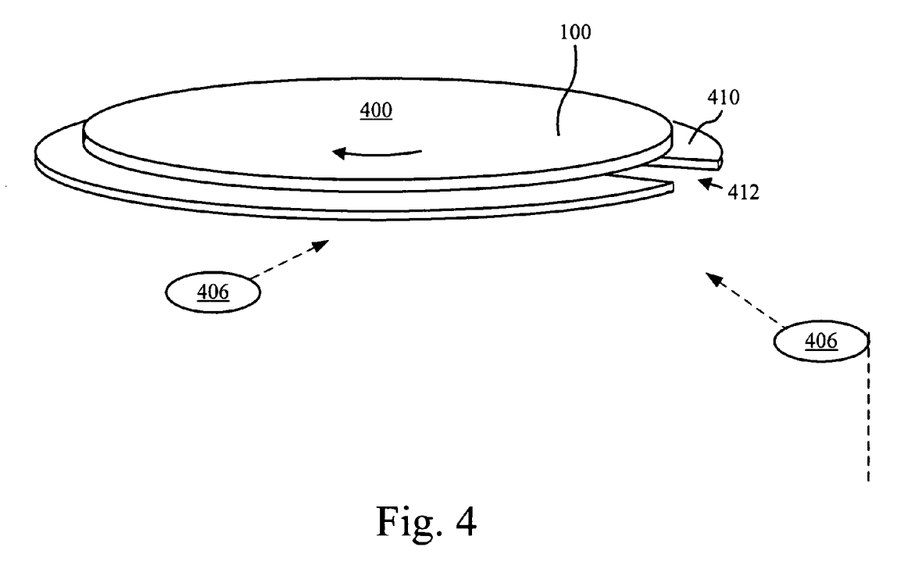
FIG. 4 is a perspective view of one embodiment of a magnetic material deposition system in accordance with the present invention.

Referring now to FIG. 4, a system for increasing data storage density on patterned media in accordance with the present invention may generally comprise a rotational element 400, a stationary shield 410, and at least one deposition source 406. The rotational element 400, stationary shield 410, and at least one deposition source 406 may reside within a vacuum chamber to facilitate effective and accurate disposition of magnetic material 114 on selected substrate surfaces. The vacuum chamber may also enable variable deposition conditions, such as dynamic gas flow and pressure control, as well as heating and cooling capabilities.

A rotational element 400 may comprise a rigid supportive disk capable of rotating with respect to a stationary shield 410. The rotational element 400 may include a spindle (not shown) to substantially center and retain a magnetic storage medium 100 in accordance with the present invention. In certain embodiments, the rotational element 400 may lie substantially superjacent the stationary shield 410, such that a portion of a magnetic storage medium 100 disposed thereon may be exposed through the shield 410 to a stream of magnetic material 114 originating from a deposition source below. A rotational element 400 may include at least one spacer (not shown) to distance the rotational element 400 at least slightly from the stationary shield 410 to promote unobstructed rotation. In some embodiments, the spindle may function as a spacer; alternatively, a spacer may be integral or coupled to a surface of the rotational element 400.

Figure 5:
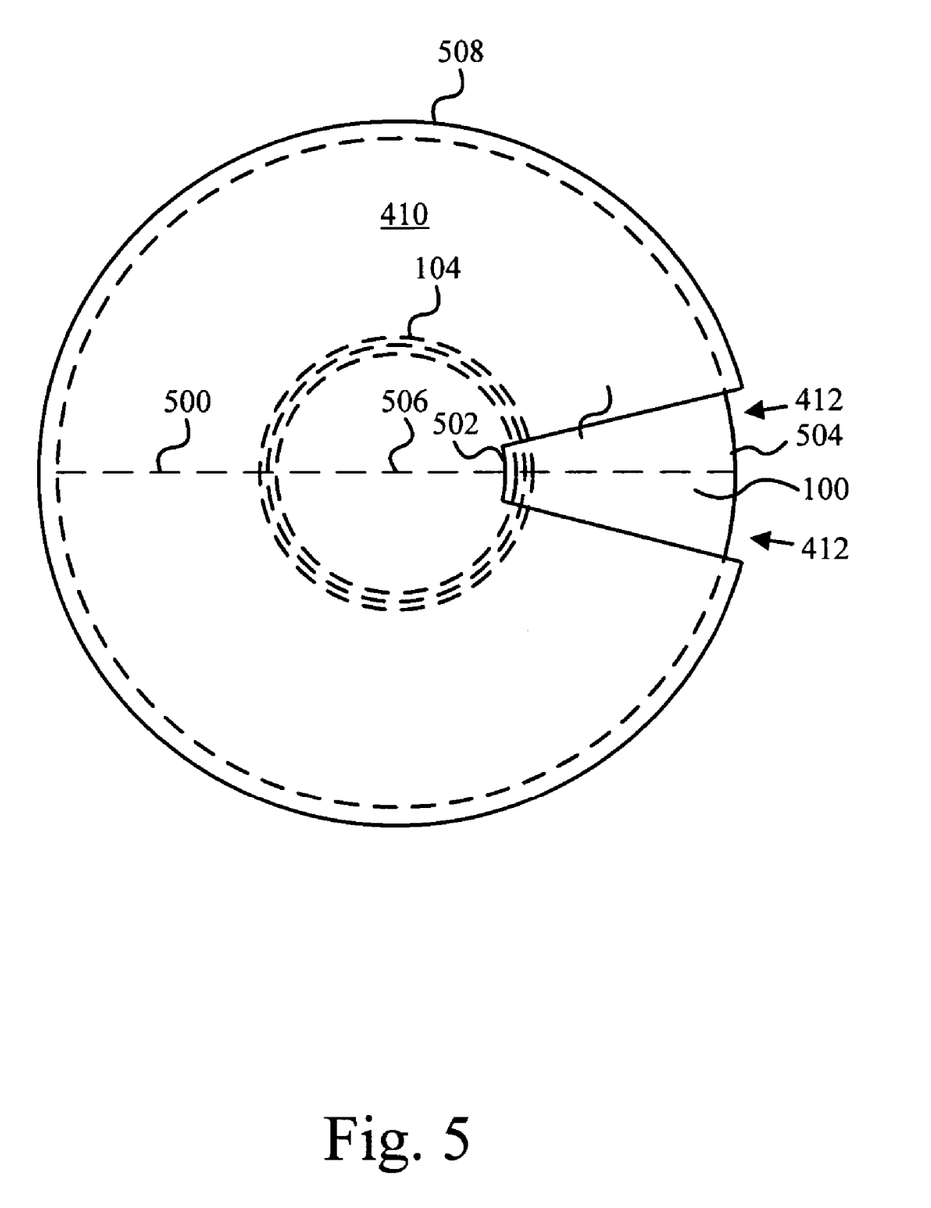
FIG. 5 is a bottom view of one embodiment of a stationary shield in accordance with certain embodiments of the present invention.

Referring now to FIGS. 4 and 5, a stationary shield 410 may comprise a substantially rigid disk having at least one aperture 412 disposed therein. The aperture 412 may extend radially from a center 506 of the stationary shield 410 to its perimeter 508, or may occupy any portion thereof. The aperture 412 thus functions to isolate a portion of a substrate 116 retained proximate, and in some embodiments substantially aligned with, the stationary shield 410, as discussed in more detail below.

The aperture 412 may further increase in surface area in a direction extending radially from the center 506 to the perimeter 508. An annular recess 104 located proximate an inner diameter of a substrate 116 may thus correspond to a substantially narrow end 502 of the aperture 412, while an annular recess 104 located proximate an outer diameter of the substrate 116 corresponds to a wider end 504 thereof. This arrangement facilitates substantially even angular bit density distribution across annular recesses 104 having varying circumferential lengths. In certain embodiments, an aperture 412 may comprise a shape substantially corresponding to a trapezoid. Of course, those skilled in the art will recognize that an aperture 412 in accordance with the present invention may comprise any shape capable of isolating a portion of a substrate 116 in communication therewith, such as an isosceles triangle, a right triangle, a rectangle, a parallelogram, or any other shape known to those in the art.

A deposition source 406 in accordance with the present invention may comprise a cathode, a heated crucible, or any other device known to those in the art capable of retaining and projecting a stream of magnetic material 114 toward a substrate 116. In certain embodiments, a plurality of deposition sources 406 reside at locations distanced from and at oblique angles of incidence to the aperture 412 of the stationary shield 410. The specific angles of incidence corresponding to each deposition source 406 may be calibrated to direct a stream of magnetic material 114 to specific exposed surfaces of a substrate 116. In this manner, the deposition sources 406 and stationary shield 400 may cooperate to deposit magnetic material 114 on opposing sidewalls 110 of a plurality of annular recesses 104 with precision.

Referring now to FIG. 5, a stationary shield 410 may comprise dimensions slightly greater than dimensions corresponding to a substrate 116 retained by the rotational element 400. Specifically, a stationary shield 410 may comprise a diameter 500 greater than a diameter corresponding to a substrate 116 such that the stationary shield 410 substantially covers an entire surface area of the substrate 116 when aligned therewith. As mentioned previously with reference to FIG. 4, a stationary shield 410 may include one or more apertures 412 radially disposed therein. Aperture 412 dimensions preferably suffice to expose a plurality of annular recesses 104 formed in the substrate 116 to a stream of magnetic material 114 directed from the deposition sources 406. In some embodiments, a length of the aperture 412 may accommodate every annular recess 104 such that magnetic material 114 may be effectively deposited on all opposing sidewalls 110 in a single rotation of the substrate 116. Those skilled in the art will recognize, however, that more than one rotation of the substrate 116 may be used to coat the opposing sidewalls 110 with magnetic material 114.

Figure 6:
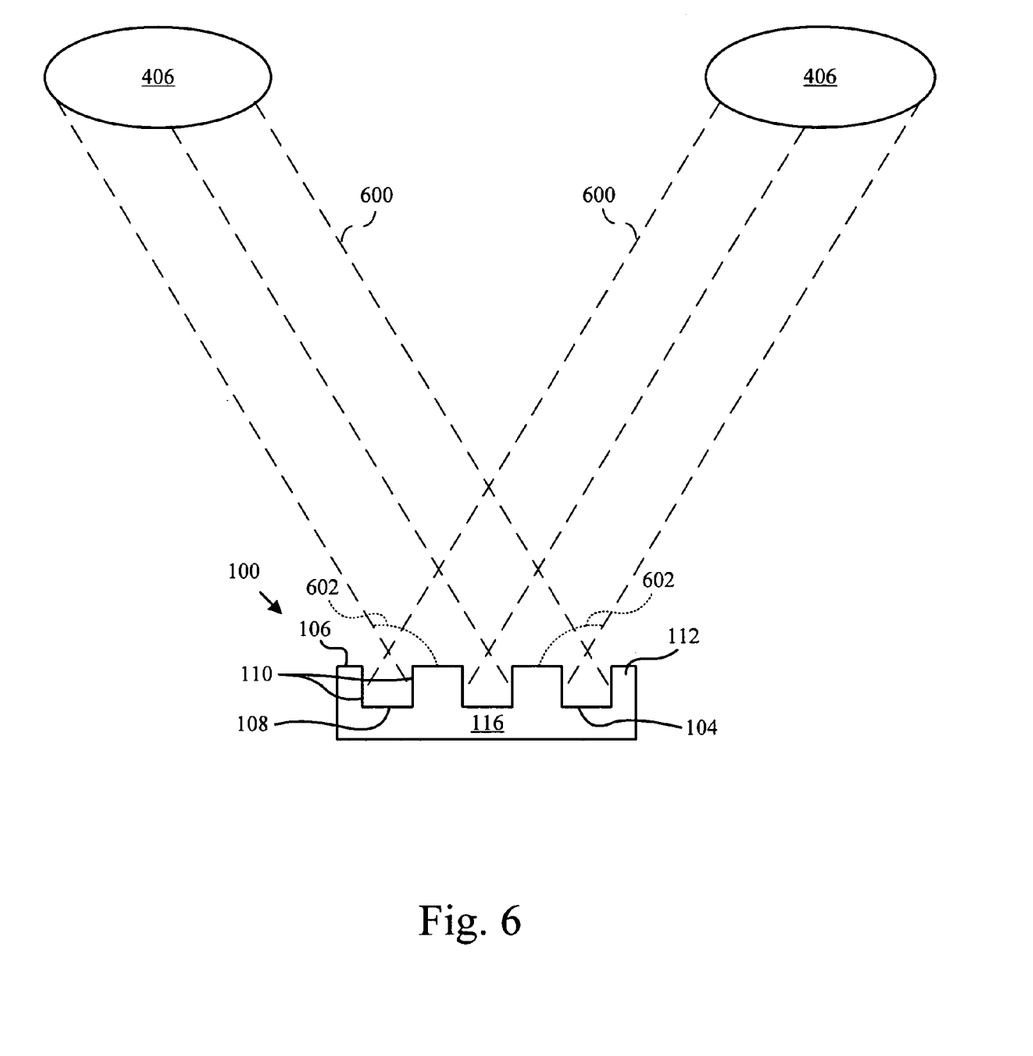
FIG. 6 is a cross-sectional view of one embodiment of a method for depositing magnetic materials onto a magnetic storage medium in accordance with the present invention.

Referring now to FIG. 6, deposition sources 406 may be implemented at oblique angles of incidence 602 relative to top surfaces 106 of a substrate 116. As discussed above, deposition sources 406 may be precisely calibrated to localize a stream 600 of magnetic material 114 to particular points of deposit. In one embodiment, a deposition source 406 may be calibrated to deposit magnetic material 114 on a first sidewall 110 of exposed annular recesses 104. A stream 600 of magnetic material 114 may thus be directed at an angle that cooperates with ridge 112 height such that magnetic material 114 collects on a top and sidewall 106 and 110 of the substrate 116 while a bottom surface 108 remains magnetically inert. Similarly, a second deposition source 406 may be calibrated to deposit magnetic material on a second sidewall 110 of every exposed annular recess 104, while maintaining a bottom surface 108 thereof substantially material-1 14 free. In this manner, magnetic material 114 coats a top surface 106 of the substrate 116 and opposing sidewalls 110 of each annular recess 104 while creating physical and magnetic independence between opposing sidewalls 110 at the bottom surface 108. As discussed in more detail above with reference to FIGS. 2 and 3, and below with reference to FIG. 7, such precise local deposition enables quick and effective isolation of multiple discrete data tracks 202 upon planarizing the magnetic storage medium 100 to remove residual magnetic material 114 from top surfaces 106 of the substrate 116.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. Additionally, the order in which a particular method occurs may or may not strictly adhere to the order of the corresponding steps shown.

Figure 7:
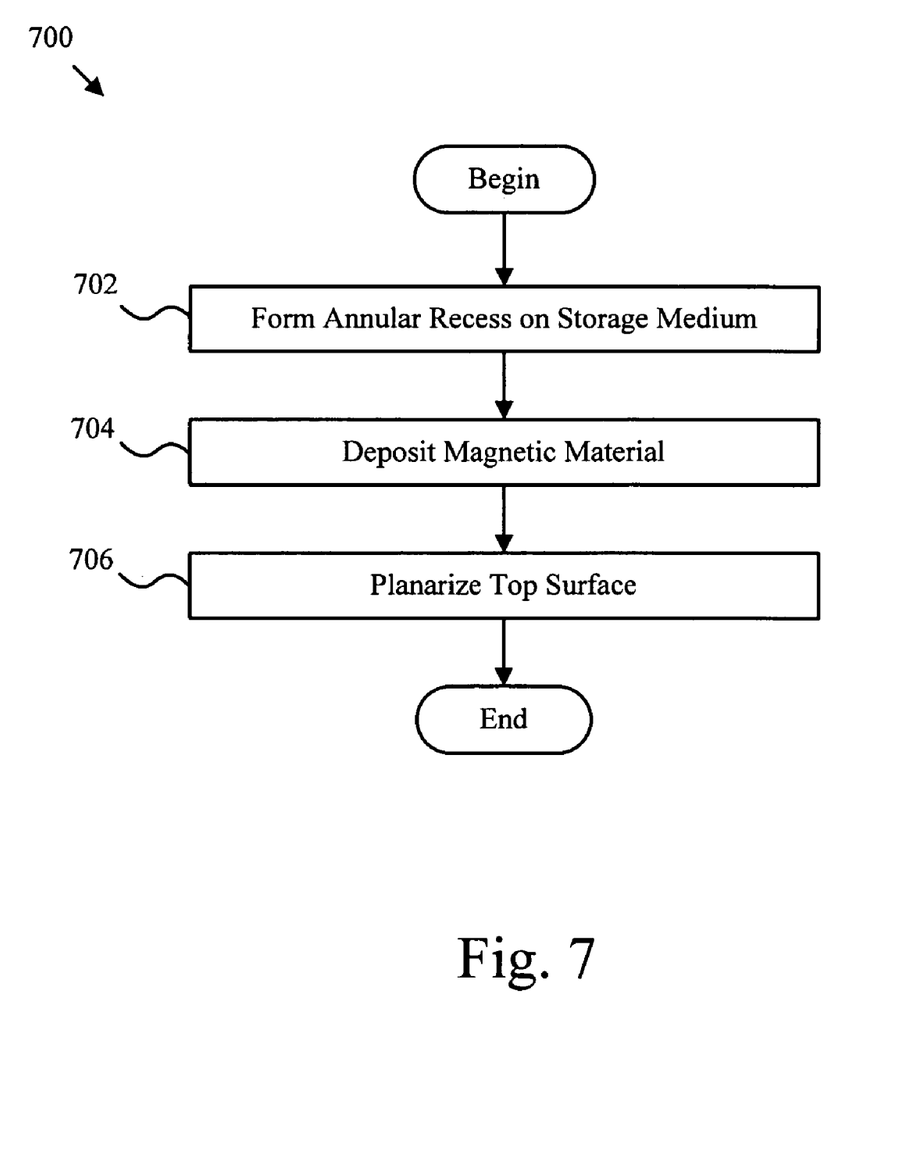
FIG. 7 is a schematic flow chart diagram illustrating one embodiment of a method for increasing data storage density in patterned media in accordance with the present invention.
Figure 8:
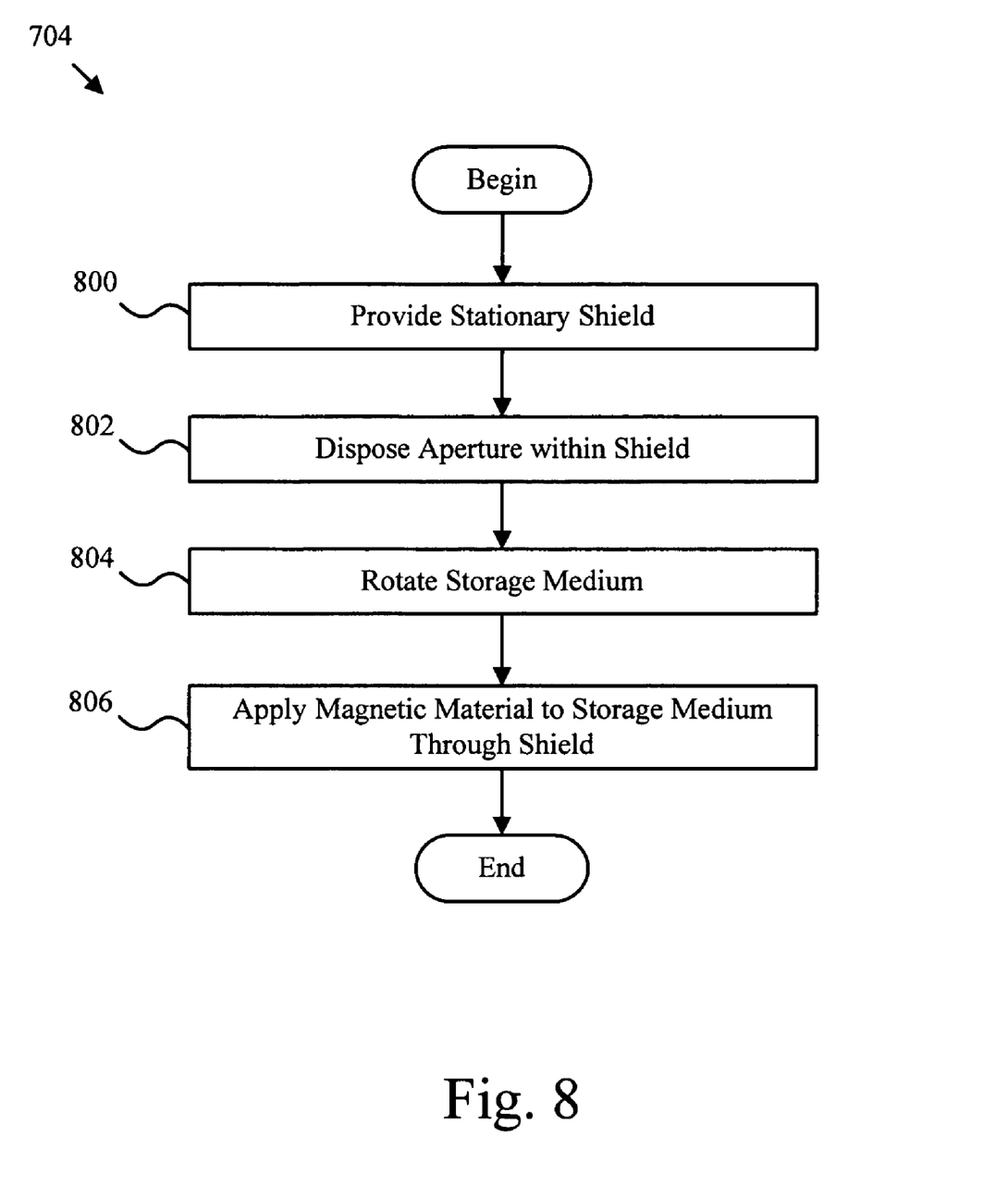
FIG. 8 is a schematic flow chart diagram detailing steps for depositing magnetic material onto a magnetic storage medium in accordance with certain embodiments of the present invention.

Referring now to FIGS. 7 and 8, a method 700 for providing increased storage density on a magnetic storage medium in accordance with the present invention may generally comprise first forming 702 an annular recess on a magnetic storage medium substrate, depositing 704 magnetic material on the substrate, and planarizing 706 a top surface of the magnetic storage medium to isolate at least two storage tracks per annular recess. As discussed above with reference to FIG. 1, forming 702 an annular recess on a magnetic storage medium in accordance with the present invention may comprise imprint lithography, ion etching, or any other process known to those in the art.

Depositing 704 magnetic material onto the substrate, as illustrated in FIG. 8, may comprise providing a stationary shield 800, disposing 802 an aperture within the shield, rotating 804 the substrate with respect to the stationary shield, and applying 806 magnetic material to the substrate through the shield. Depositing 704 magnetic material onto the substrate may occur within a vacuum such that magnetically charged particles may be precisely deposited according to a predetermined angle of incidence. In some embodiments, two stationary shields 800 may be provided to shield either surface of a substrate 116. Specifically, the substrate may be retained and rotated at a position substantially intermediate the vacuum chamber such that a plurality of deposition sources proximate either end of the vacuum chamber may deposit magnetic material through the stationary shields substantially simultaneously to either face of the substrate.

In other embodiments, rotating 804 the substrate with respect to the stationary shield is optional. Indeed, the present invention contemplates providing a plurality of apertures within the shield, each corresponding to specifically oriented deposition sources. In this manner, magnetic material may be deposited onto a majority of the substrate without rotation thereof. Similarly, in other embodiments, the shield and/or deposition sources may rotate to enable deposition onto a substantially stationary substrate.

A final step of the present method 700 contemplates planarizing 706 a top surface of the magnetic storage medium substantially corresponding to top surfaces of the annular recesses formed therein. As previously discussed, planarizing 706 in accordance with the present invention may comprise any chemical or mechanical process known to those in the art, or a combination thereof. Further, planarizing may comprise applying to the magnetic storage medium a protective layer and/or lubricating layer to protect the magnetic storage medium from damage caused by accidental contact with the read/write heads, or with foreign particulate matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing increased storage density on a magnetic storage medium, the method comprising:

forming a patterned substrate comprising a top surface and a plurality of concentric annular recesses formed around a center axis of the magnetic storage medium, each recess comprising a bottom surface and opposing sidewalls;

depositing magnetic material directly on the substrate on the opposing sidewalls of the plurality of recesses while leaving the bottom surface of each recess substantially free of magnetic material; and planarizing the top surface to a depth that physically isolates recordable regions within distinct recesses of the plurality of recesses, and that physically isolates recordable regions on each of the opposing sidewalls of each recess.

2. The method of claim 1, wherein forming the patterned substrate comprises conducting a directional etch process.

3. The method of claim 2, wherein the directional etch process comprises reactive ion etching.

4. The method of claim 1, wherein depositing the magnetic material comprises directionally applying the magnetic material from at least one substantially oblique angle of incidence.

5. The method of claim 1, wherein depositing the magnetic material comprises rotating the magnetic storage medium to facilitate controlled deposition of the magnetic material.

6. The method of claim 5, wherein depositing the magnetic material further comprises providing a stationary shield proximate the magnetic storage medium adapted to confine deposition of the magnetic material to a limited surface area of the magnetic storage medium.

7. The method of claim 6, wherein providing a stationary shield further comprises disposing within the stationary shield a substantially narrow aperture corresponding to a portion of the magnetic storage medium to facilitate precise deposition of the magnetic material.

8. The method of claim 1, wherein planarizing the top surface comprises implementing at least one of a chemical polishing process and a mechanical polishing process to polish the top surface.

9. The method of claim 1, wherein planarizing the top surface comprises eliminating magnetic material deposited thereon.

10. A method for providing increased storage density on a magnetic storage medium, the method comprising:

forming a patterned substrate comprising a top surface and a plurality of concentric annular recesses formed around a center axis of the magnetic storage medium, each recess comprising a bottom surface and opposing sidewalls;

depositing magnetic material directly on the substrate on the opposing sidewalls of the plurality of recesses, the magnetic material deposited from at least one substantially oblique angle of incidence such that the bottom surface of each recess remains substantially free of magnetic material, the magnetic material having a substantially similar magnetic composition such that each opposing sidewalls comprises an independent recordable region; and planarizing the top surface to a depth that physically isolates recordable regions within distinct recesses of the plurality of recesses, and that physically isolates recordable regions on each of the opposing sidewalls of each recess.

11. The method of claim 10, wherein forming the patterned substrate comprises conducting a directional etch process.

12. The method of claim 11, wherein the directional etch process comprises reactive ion etching.

13. The method of claim 10, wherein depositing the magnetic material comprises rotating the magnetic storage medium to facilitate controlled deposition of the magnetic material.

14. The method of claim 13, wherein depositing the magnetic material further comprises providing a stationary shield proximate the magnetic storage medium adapted to confine deposition of the magnetic material to a limited surface area of the magnetic storage medium.

15. The method of claim 14, wherein providing a stationary shield further comprises disposing within the stationary shield a substantially narrow aperture corresponding to a portion of the magnetic storage medium to facilitate precise deposition of the magnetic material.

16. The method of claim 10, wherein planarizing the top surface comprises implementing at least one of a chemical polishing process and a mechanical polishing process to polish the top surface.

17. The method of claim 10, wherein planarizing the top surface comprises eliminating magnetic material deposited thereon.

* * * * *

UNITED STATES PATENT AND TRADEMARK OFFICE
Certificate

Patent No. 7,553,426 B2                                                                            Patented: June 30, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Henry Hung Yang, San Jose, CA (US).

Signed and Sealed this Sixth Day of December 2011.

NADINE NORTON
*Supervisory Patent Examiner*
Art Unit 1713
Technology Center 1700